March 27, 1934.  H. HUEBER  1,952,866
WIPER ARM AND MOUNTING
Filed June 23, 1932
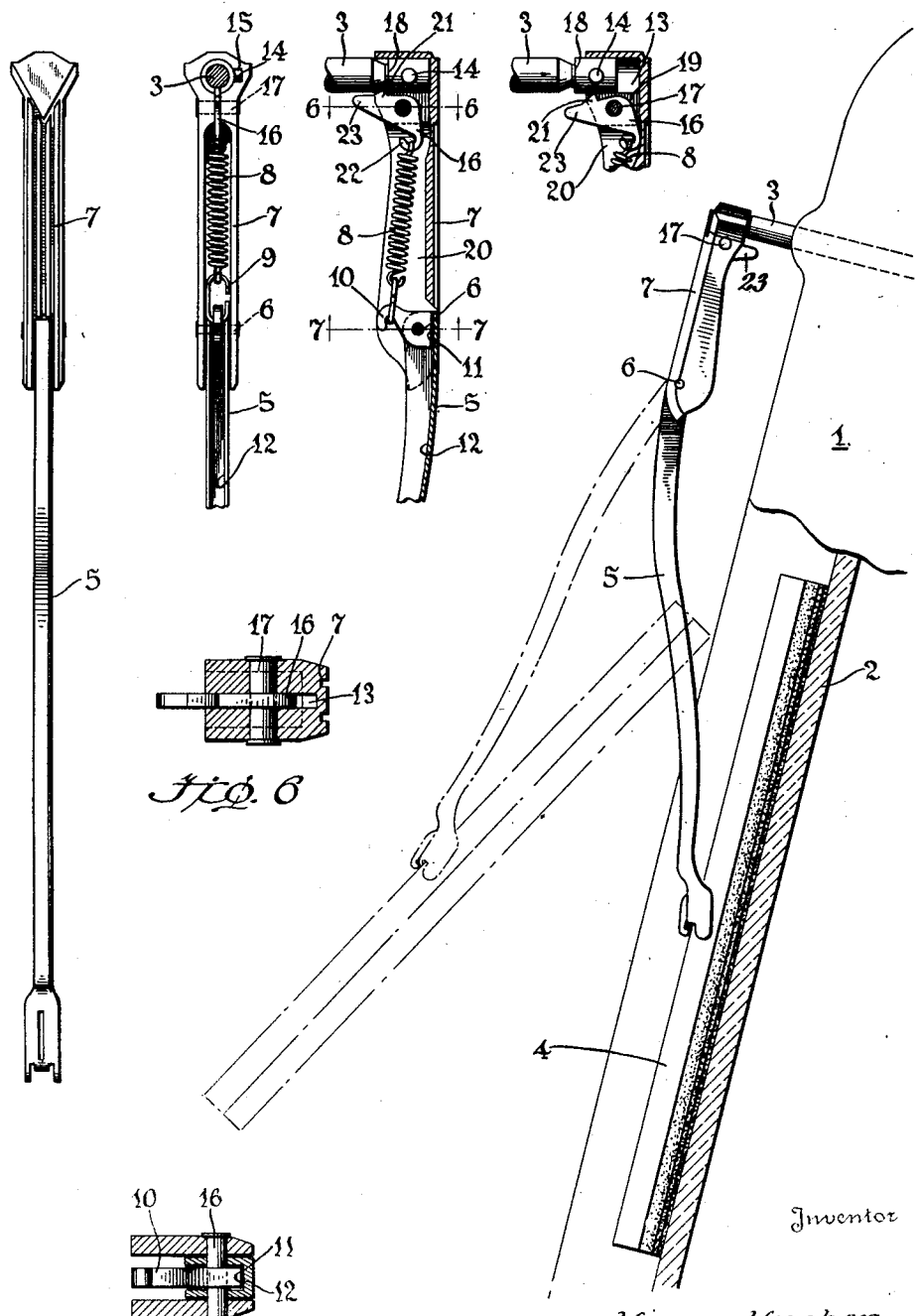

Patented Mar. 27, 1934

1,952,866

UNITED STATES PATENT OFFICE 1,952,866

WIPER ARM AND MOUNTING

Henry Hueber, Buffalo, N. Y., assignor to Trico Products Corporation, Buffalo, N. Y.

Application June 23, 1932, Serial No. 618,984

8 Claims. (Cl. 15—255)

This invention relates to a windshield cleaner and more particularly to the wiper carrying arm and its mounting on the actuating part of the windshield drive mechanism.

In my former application Serial No. 606,031, filed April 18, 1932 I disclosed an improved type of wiper carrying arm having an outer blade carrying section pivoted to an inner or shaft carried section and urged toward the windshield by a spring on the latter section, the arm being attached to the shaft by a pin fastener.

The present invention is an improvement on said invention and primarily is directed to a novel mounting of the arm on its actuating shaft.

In the drawing:

Fig. 1 is a fragmentary view of the improved windshield cleaner mounted on a windshield.

Fig. 2 is a front elevation of the wiper carrying arm.

Fig. 3 is a fragmentary rear elevation thereof showing the actuating shaft in section.

Fig. 4 is a longitudinal sectional view through a portion of the arm showing its manner of attachment to the actuating shaft.

Fig. 5 is a view similar to Fig. 4 but showing the arm being attached to the actuating shaft.

Fig. 6 is a detail sectional view about on line 6—6 of Fig. 4.

Fig. 7 is a similar view about on line 7—7 of Fig. 4.

Referring more in detail to the accompanying drawing, numeral 1 designates the front portion of an automobile having the windshield 2 disposed therein and the wiper actuating shaft 3 journaled in the frame or body construction above the transparency, the inner end of the shaft being operated in a suitable manner as by a motor not herein illustrated.

The wiper blade 4 is connected to the outer end of the blade carrying section 5 of the arm, which latter is illustrated as comprising said section 5 hinged by a pivot pin 6 to an inner mounting or shaft carried section 7 in a manner so that the wiper carrying section may be swung outwardly away from the windshield to facilitate attachment of the wiper blade 4. The wiper carrying section 5 is preferably channeled and is yieldably urged toward the windshield by a spring 8 which has one end connected, as by an open link 9, to an extending leg 10 of said carrying section 5. This leg may be mounted on the pin 6 and held against turning thereon by the flat face 11 seating in the bottom 12 of the channel of said outer section. The leg 10 is therefore fixedly related with the blade carrying section to form what might be termed a bell crank construction, the shorter leg 10 of the bell crank being acted on by the spring 8 to move the longer leg, with its wiper blade 4, toward the windshield.

The actuating shaft 3 is detachably connected to the arm mounting section 7. In the particular embodiment herein illustrated said section is provided with a socket 13 which receives the outer end of the actuating shaft in a telescopic manner and is held against turning thereon in a suitable manner, such as by the shaft carried key pin 14 fitting in a keyway 15 in the wall of the socket 13.

To retain the wiper arm on its actuating shaft there is provided a latch 16. In the present showing it is illustrated as being movably mounted on the arm section 7, as by means of a pivot pin 17, and engages behind a shoulder 18 on the shaft. The latch 16 is disposed in a slot 19 between the socket 13 and the spring housing chamber 20 and is placed under a resilient urge to hold the latch nose 21 engaged with the shoulder 18. For this purpose the spring 8 is engaged over the hook extension 22 of the latch, and therefore this spring serves a dual function first, in urging the wiper blade toward the windshield and, secondly, in urging the latch nose 21 into engagement with the shoulder 18. To withdraw the latch nose from the shoulder a finger hold 23 projects rearwardly from the mounting section so as to be accessible yet concealed to view from the front.

In mounting the wiper arm on the actuating shaft, the latter is engaged in the socket and the arm pushed rearwardly, the nose 21 riding along the shaft until it comes opposite to the shoulder 18 whereupon the spring 8 will engage the nose behind the shoulder and securely lock the arm to its actuating shaft. The connecting parts are fully protected from the weather and yet are readily accessible to disengage the nose 21 from the shoulder and permit withdrawal of the arm from the shaft.

What is claimed is:

1. A wiper arm for windshield cleaners, comprising, in combination with a shaft, a laterally extending arm having telescopic fit with the shaft, a latch pivoted on said arm and having a beveled nose for riding over a part on said shaft and engaging in its operative position therebehind to prevent displacement of the arm from the shaft, said arm having a spring chamber, and a spring mounted in the chamber and connected to the latch for urging the latter to its operative position.

2. A wiper arm for windshield cleaners comprising, in combination with a shaft, a mounting section having telescoping fit with the shaft, a wiper carrying section hinged to the mounting section, a latch pivoted on said mounting section for engaging in its operative position a shoulder on the actuating shaft, and resilient means connected to the latch and to the hinged wiper carrying section and acting simultaneously to urge the carrying section toward the windshield and the latch into its operative position.

3. A wiper arm for windshield cleaners comprising, in combination with a shaft, an arm having an opening receiving the end of the shaft, a latch on one of said elements for interlocking in its operative position with the other of said elements to secure the arm on the shaft, said arm having a wiper carrying part movably mounted with respect thereto, and resilient means operatively connected to the latch and to the wiper carrying part and acting in a dual capacity to urge said wiper carrying part toward the windshield and said latch into its operative position.

4. A wiper arm having a socket for slidably receiving an actuating shaft, a latch movably connected to the rear side of the arm and having a nose engageable in its operative position with a shoulder on the shaft to secure the arm to the shaft, said latch having a projecting part operable to move the latch to an inoperative position, said arm having in its rear face a recess, and spring means in the recess and connected to the latch for urging its nose into a shoulder engaging position.

5. A wiper arm for windshield cleaners, said arm having a socket for slidably receiving an actuating shaft against relative turning movement, a latch movably mounted on the arm adjacent the socket and engageable in its operative position with a shoulder on the shaft to secure the arm against displacement from the shaft, said arm having in its socketed face a recess, a spring disposed in the recess and connected to the latch for urging it into a shoulder engaging position, said arm having a blade carrying section pivotally mounted thereon and provided with an angularly extending part to which said spring is connected for urging said section toward the windshield glass whereby said spring will serve in a dual capacity to move the blade carrying section toward the windshield and said latch to an operative position.

6. A wiper arm for windshield cleaners having a part for telescoping with a shaft, said arm having a recessed face, a latch pivoted in the recess and having a nose for interlocking with an associated shaft to retain the arm on the shaft, said latch having a spring anchoring part, a wiper carrying section constituting a part of said arm and pivotally connected to the remaining portion of said arm at a point spaced from the latch, said wiper carrying section having a spring anchoring part extending into the recess of said arm, and a spring disposed within the arm recess and suspended under tension by and between said spring anchoring parts.

7. A wiper arm for windshield cleaners comprising, in combination with a shaft, an arm having a recess receiving the shaft, said arm being displaceable from the shaft in an axial direction, a latch movably carried within the arm recess for engaging in its operative position with a shoulder on the shaft, said latch having actuating means extending rearwardly from the arm, and resilient means urging the latch into its operative position.

8. A wiper arm for windshield cleaners, comprising, in combination with a shaft member, an arm mounting member, one of said members having telescopic fit with the other member, a latch movably mounted on said mounting member and interlocking in its operative position with the shaft member to secure the mounting member on the shaft member, a wiper carrying section hinged to the mounting member, and resilient means connecting the latch directly to the hinged section and normally acting dually to urge the carrying section toward the mounting windshield and the latch into its operative position.

HENRY HUEBER.